J. E. CEPEDA.
COVER FOR KETTLES AND THE LIKE.
APPLICATION FILED NOV. 4, 1910.
993,505. Patented May 30, 1911.
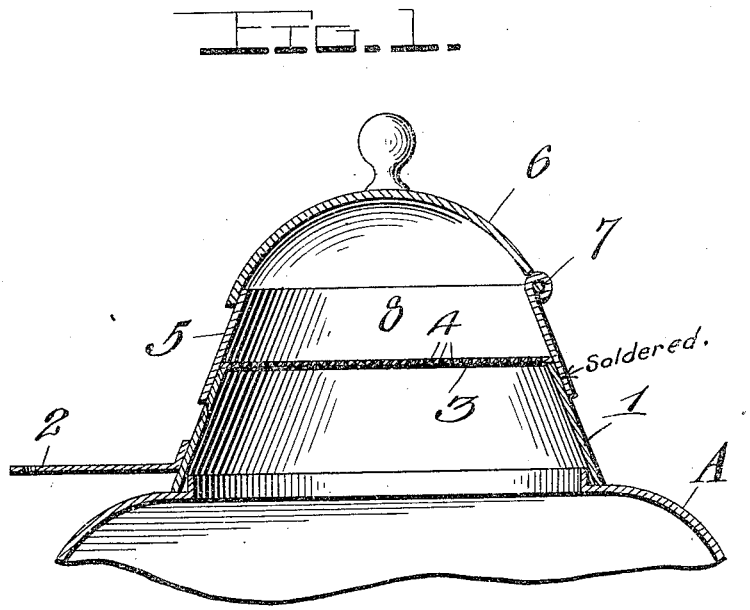
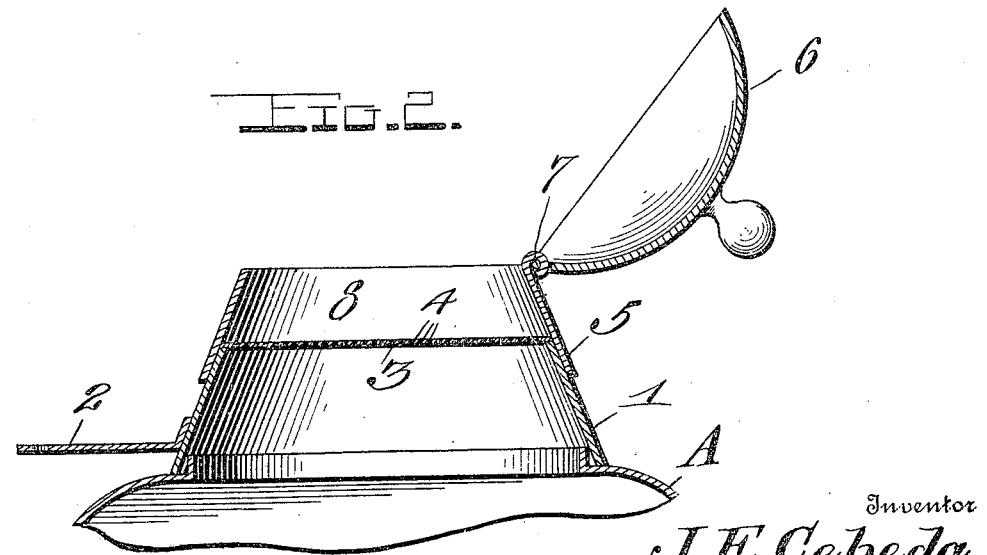
Witnesses
Chas. L. Griesbauer.
M. K. Reeder.
Inventor
J. E. Cepeda,
By Watson E. Coleman.
Attorney

UNITED STATES PATENT OFFICE.

JOSEFA E. CEPEDA, OF HELOTES, TEXAS.

COVER FOR KETTLES AND THE LIKE.

993,505.                   Specification of Letters Patent.      Patented May 30, 1911.

Application filed November 4, 1910. Serial No. 590,753.

*To all whom it may concern:*

Be it known that I, JOSEFA E. CEPEDA, a citizen of the United States, residing at Helotes, in the county of Bexar and State of Texas, have invented certain new and useful Improvements in Covers for Kettles and the Like, of which the following is a specification, reference being had to the accompanying drawings.

This invention is an improved cover for use on kettles, pots, saucepans, and other culinary vessels, and consists in the construction, combination and arrangement of devices hereinafter described and claimed.

The object of the invention is to provide an improved cover of this class which comprises a base portion for direct application to the upper portions of the vessel, and having a perforated diaphragm for escape of steam, and a hinged cap which is connected to the said base portion, and may be opened therefrom, or closed thereon, the said improved cover, preventing the hands from being burned by steam from the vessel.

In the accompanying drawings—Figure 1 is a vertical sectional view of a cover constructed in accordance with my invention, showing the same closed and in place on the upper side of a kettle, and Fig. 2 is a similar view of the same with the cap open.

The base portion 1 of my improved cover is annular in form and tapers upwardly, its larger lower diameter being such as to adapt the said base portion to be fitted on the upper side of a kettle or other vessel such as indicated at A. On one side of the base 1, is a handle 2 which projects outwardly therefrom, and serves as a convenient means for lifting and moving the cover, and also enables the same to be readily hung up when the cover is not in use. In the upper portion of the base 1 is a diaphragm 3 which covers the same, and is provided with perforations as at 4. On the base 1 is a flange rim 5 which is fitted on the upper portion thereof, and is secured thereto as by means of solder, and the said flange rim is also here shown as tapering upwardly so that its upper portions overhang the perforated diaphragm and extends above the same.

A cap or cover 6 which is here shown as concavo-convex in form, but which may be of any suitable form is fitted on the upper portion of the flange rim and is hinged thereto at one side as at 7, so that the said cap or cover may be opened upwardly from the flange rim or closed downwardly thereon.

It will be observed upon reference to the drawings that owing to the provision of the flange rim, which projects above the perforated diaphragm, a space or chamber 8 is formed between the top or cover, and said perforated diaphragm. Articles to be steamed may be placed in this space, and eggs especially may be very conveniently cooked therein.

Before removing a cover from a vessel containing boiling water, the cap 6 should be opened so as to permit the escape of steam from the vessel and hence avoid burning the hands. The perforated diaphragm on the base member 1 in connection with the rim flange 5 which extends upwardly above said diaphragm and base portion prevents the contents of the vessel from boiling over.

My improved cover may be made of any suitable material, such as sheet metal and may be japanned or finished in any other suitable manner. The cap or cover 6 has a knob 8 to facilitate the opening and closing of the same.

My improved cover may be readily manufactured at small cost, is very strong and durable, and will be found very convenient and serviceable.

I claim:—

The herein described cover for pots, kettles and other like articles comprising an upwardly tapering annular base portion to fit on the top of the vessel, and provided at one side with a handle, the said base portion being open at its lower end, a perforated diaphragm on the upper end of said base portion, and extending across the same, an upwardly tapering annular flange rim secured to and extending upwardly above the said base portion, the lower end of said flange rim receiving the upper end of the base portion, and fitting thereon, and a cap fitted on the flange rim and hinged thereto at one side.

In testimony whereof I hereunto affix my signature in the presence of two witnesses.

JOSEFA E. CEPEDA.

Witnesses:
ANDREW H. YOUNG,
A. G. MCNEILL.

---

Copies of this patent may be obtained for five cents each, by addressing the "Commissioner of Patents, Washington, D. C."